June 6, 1961 A. NOVICK 2,986,976
ENVELOPE PATCH APPLIER
Filed Feb. 4, 1958 11 Sheets-Sheet 1

INVENTOR.
Abraham Novick
BY
Moses, Nolte, Crews & Berry
ATTORNEYS

June 6, 1961 A. NOVICK 2,986,976
ENVELOPE PATCH APPLIER
Filed Feb. 4, 1958 11 Sheets-Sheet 2

INVENTOR
ABRAHAM NOVICK
BY
Moses, Nolte, & Nolte
ATTORNEYS

Fig. 4.

June 6, 1961 A. NOVICK 2,986,976
ENVELOPE PATCH APPLIER
Filed Feb. 4, 1958 11 Sheets-Sheet 6

INVENTOR.
Abraham Novick
BY
Moses, Nolte, Crews + Berry
ATTORNEYS

June 6, 1961  A. NOVICK  2,986,976
ENVELOPE PATCH APPLIER
Filed Feb. 4, 1958  11 Sheets-Sheet 9

INVENTOR.
Abraham Novick

BY Moses, Nolte, Crews + Berry
ATTORNEYS

June 6, 1961 A. NOVICK 2,986,976
ENVELOPE PATCH APPLIER
Filed Feb. 4, 1958 11 Sheets—Sheet 10

INVENTOR.
Abraham Novick

BY Moses, Nolte, Crews & Berry
ATTORNEYS

June 6, 1961 A. NOVICK 2,986,976
ENVELOPE PATCH APPLIER
Filed Feb. 4, 1958 11 Sheets—Sheet 11

Fig. 27.

INVENTOR
ABRAHAM NOVICK
BY
Moses, Nolte, & Nolte
ATTORNEYS

United States Patent Office 2,986,976
Patented June 6, 1961

2,986,976
ENVELOPE PATCH APPLIER
Abraham Novick, Flushing, N.Y., assignor to F. L. Smithe Machine Co., Inc., New York, N.Y., a corporation of New York
Filed Feb. 4, 1958, Ser. No. 713,214
12 Claims. (Cl. 93—61)

This invention relates to patch applying mechanism for patching sheet material. An example of a patch applying operation of the kind contemplated occurs when a transparent patch is applied to cover the window opening of a window envelope blank. For illustrative purposes the invention will be disclosed in connection with window envelope blank patching.

The present application is a continuation-in-part of application No. 399,238, filed December 21, 1953 for Envelope Patch Applier by the present inventor, now abandoned. The present invention is particularly directed to a patch applying mechanism wherein provision is made for applying patches directly by a suction drum immediately after the patches have been cut from a web. In this modification of an envelope patch applying apparatus provision is made to accommodate a projecting flying cutter of the suction drum during the revolution of the cutter in contact with a cooperating envelope blank advancing roller. The mechanism to which this continuation-in-part application is directed includes the construction and all the advantages of the mechanism disclosed in the original application, but includes details of workable means for effecting these advantages without requiring the segment applicator.

It is common practice in the art to feed blanks which are to be patched at uniform speed and to feed out a web of patch material at a comparatively slow, uniform speed onto a faster running, slip drag, patch applying cylinder. Such prior slip drag cylinders have been equipped with cutting bars which stand flush with the surface of the cylinder for cooperating with pinch cutting knives. The pinch cutting knives have been caused to travel at the surface speed of the slip drag cylinder.

Although the patch web is fed out toward the slip drag cylinder at a comparatively slow constant speed, it is necessary that the web on the cylinder be traveling at the surface speed of the cylinder at the instant of the pinch cut. Hence, the patch web must be accelerated to that speed for the cut. For this purpose the web is caused to travel to the slip drag cylinder around a movable loop forming guide. Slack is thus made available to be payed out when the web is seized and fed forward in unison with the slip drag cylinder. The loop forming guide is necessarily slow acting, and since it must be allowed time to fully restore the loop after each cutting operation, an important limitation of speed is imposed upon the production rate of the machine.

It is an object of the present invention to provide a mechanism capable of a much higher rate of output than the prior art mechanism referred to. To this end a patch web is paid out at uniform speed onto a suction drum or cylinder and a flying cutter is provided for severing patches from the web. The flying cutter consists of a stationary blade and a cooperative movable blade, the latter arranged to travel with the suction drum and to protrude slightly beyond the periphery of the drum. The stationary blade is slightly skewed to provide a progressive cut. A cutter of this type does not cause the web to be accelerated at cutting nor require that it be so accelerated. No vibratory loop forming device is required, and there is no necessity for limiting the speed of the mechanism because of the inclusion of any such device. The improved mechanism is capable of operating more than twice as fast as the old mechanism which it is designed to supplant.

In the modification with which this application is particularly directed, means are provided to permit the suction drum with its projecting flying cutter to directly roll the patches onto envelopes advanced between it and a cooperating roller. In this instance a separate patch applying suction segment is not required.

In the drawings forming part of this specification:

FIGS. 21 to 25 illustrate features of a modified machine in which the blanks are carried past the patching station by belt conveyors which are adapted to be adjusted laterally of the machine in accordance with the requirements of the work.

A machine constructed in accordance with the principles outlined in copending application Serial No. 399,238, now abandoned filed by applicant will be described first and then the embodiment of FIG. 27 to which this invention is particularly directed will be described in detail.

The illustrative machine comprises a main frame 1 (FIG. 4) and feeding mechanism 2 (FIG. 1) for advancing envelope blanks 3 continuously, and at uniform speed. The envelope blanks are definitely timed in their movements so that window patch applying mechanism will be effective to apply a patch to a predetermined area of each traveling blank.

Figure 1:
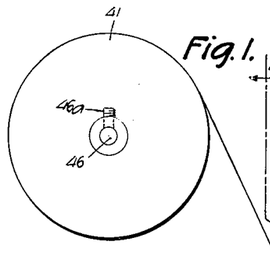
FIG. 1 is a fragmentary view in sectional elevation of a portion of an illustrative envelope making machine embodying the present invention, the section being taken on the line 1—1 of FIG. 1, looking in the direction of the arrows.

The envelope blanks are advanced from right to left in FIG. 1, by means of a series of rotary feed couples, 5, 6 and 7, and by a pin and chain conveyor 8, in cooperation with a feed segment 9 and a roller 9A.

The blank engaging elements of the feed couples, 5, 6 and 7 are all driven uniformly at the same peripheral speed. The blanks are supported upon a table 10 and are advanced over a bed cylinder or roller 11, which is driven uniformly at the same peripheral speed as the elements of the feeding couples.

In approaching the roller 11, the envelope blanks pass a gumming mechanism (not shown) for gumming the marginal area around the window opening of each blank. A rotary patch applier comprising a sector 12 operates cycle for cycle with the envelope blank feeding and gumming mechanisms. The sector 12 acts as a rotary patch carrier to carry a patch at uniform speed from a transfer point at which it receives the patch into association with each envelope blank, and in cooperation with the roller 11, to roll the patch onto the blank and press it firmly against the gummed margin of the blank which surrounds the window opening.

The sector 12 and all of the other mechanisms to be described which have to do with the feeding, severing and delivering of the patch material up to the point of application of the patch to an envelope blank is driven from a uniformly rotating shaft 13 upon which the roller 11 is made fast.

The shaft 13 has fast upon it a gear 14 (FIG. 4) which drives a gear 15 of equal diameter, the gear 15 being secured adjustably upon a hollow shaft 16 by means of a set screw 16x. The patch applying segment 12 is fixed upon one arm of a lever 30, pivotally mounted on an arm 31 which extends from a collar 32 fast upon the hollow shaft 16. The tail of the lever 30 is normally drawn inward by a spring 34 connected to the tail of the lever and to a pin 35 fast on the collar 32. Inward movement of the tail of the lever 30, which tends to project the segment 12, outward, is limited by engagement of an abutment screw 36, threaded through the lever tail, with the collar 32. By the mounting described, the sector 12 is made free to yield toward the axis of the shaft 16, but outward movement of the sector 12, away from the shaft 16 is limited by the abutment screw 36 and the collar 32.

The sector 12 is provided with suction passages in its forward margin, which communicate through a flexible rubber tube 39 with the interior of the hollow shaft 16. Provision is made of a source of suction and of suitable valve means for controlling the alternate admission of suction and atmospheric air to the bore of the shaft 16, so as to cause the suction to be on from the instant when the suction passages of the sector 12 first come opposite the leading end of a patch until the leading end of the patch has been carried into engagement with an envelope blank. At the latter point the suction is broken and atmospheric air is admitted so as to avoid any tendency of the suction passages in the sector 12 to hold the patch and cause it to be separated from the envelope blank.

Figure 4:
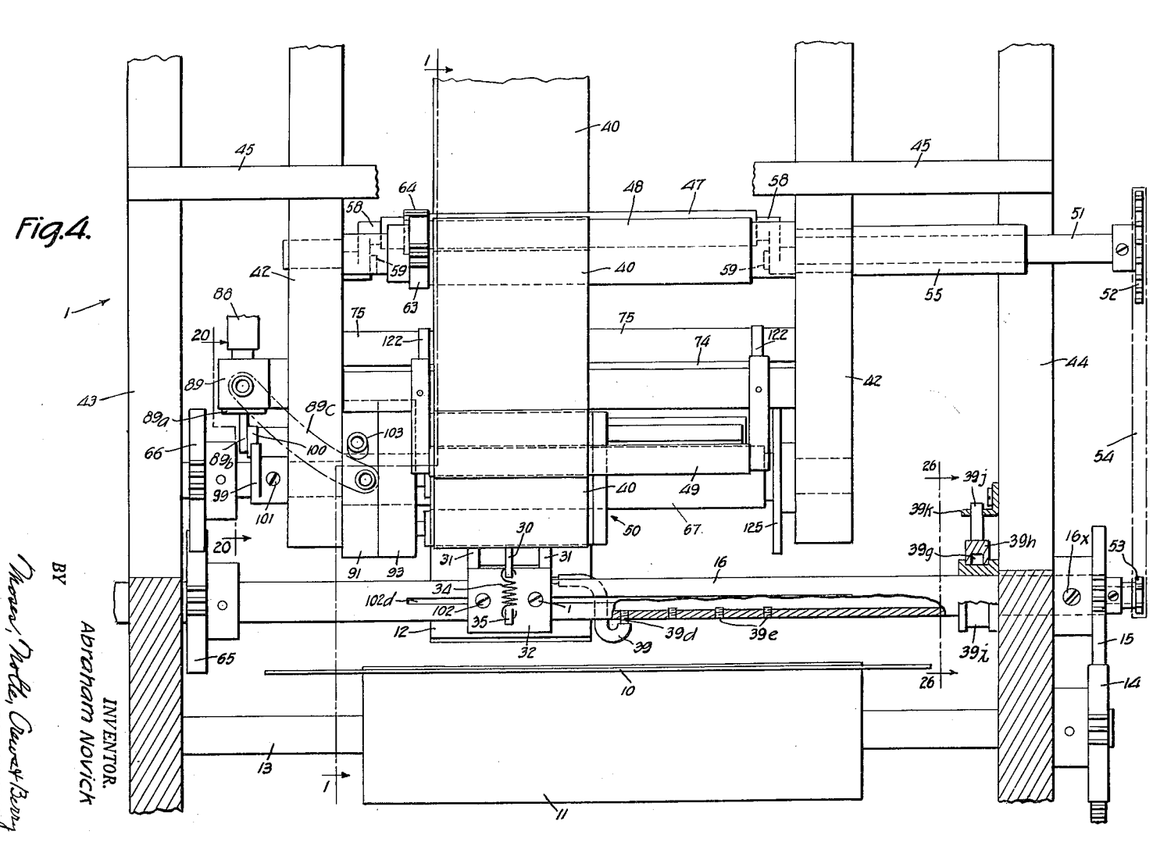
FIG. 4 is a fragmentary sectional view of the portion of the machine shown in FIG. 1, the section being taken on the line 4—4 of FIG. 1, looking in the direction of the arrows.

The patching apparatus comprises novel mechanism for drawing a web 40 of patch material from a reel 41, cutting patches of predetermined length from the web and transferring the patches one by one to the segment 12 for application to the successive envelope blanks. Such mechanism is carried by an auxiliary frame which includes auxiliary side frame members 42 (FIG. 4). The members 42 are supported from side members 43 and 44 of the main frame 1 in any suitable manner, as by means of supporting cross rod 45.

The reel 41 is supported in the auxiliary frame, by means of open bearings (not shown) of a removable shaft 46 (FIG. 1). The reel hub may be secured in different selected positions longitudinally of the shaft by means of a set screw 46a. From the reel, the web 40 is drawn downward by feed rollers 47 and 48 being paid out by the feed rollers at a constant, predetermined speed around a guide roller 49 and onto a slip drag suction drum 50. The feed rollers 47, 48 may be driven at various selected speeds according to the length of patch desired, the rate of web feed controlling the amount of web fed out in a patching cycle and hence the length of the patch that is cut off and applied.

The feed roller 48 is fast upon a shaft 51, which shaft has a sprocket 52 (FIGS. 1 and 4) secured to it with capacity for quick detachment and replacement. A comparatively small sprocket 53 is secured to the right end of shaft 16 with capacity for quick detachment and replacement. The sprocket 53 drives the sprocket 52 through a chain 54. When it is desired to change the length of patch web fed out by the rollers 47, 48, during a patching cycle, the sprockets 52 and 53 are replaced by other sprockets to change the drive ratio.

The shaft 51 is rotatively supported at its right hand end in a sleeve 55, fixed to the auxiliary frame member 42, and at its left hand end in the other auxiliary frame members 42. The feed roller 47 is supported on a shaft 57 which is mounted in arms 58. The arms 58 are supported on stub shafts 59 which are rotatably mounted in the auxiliary frame members 42. The arms 58 are urged in a direction to carry the roller 47 toward the roller 48 by compression coil springs 60, which springs abut against stationary brackets 61, carried by the frame members 42. Adjustable stop screws 62 threaded through brackets 63, engage the arms 58, and limit approach of the roller 47 toward the roller 48. The screws are adjusted according to the thickness of the patch web material so as to prevent objectionable pressure from being applied against the web material. The shafts 51 and 57 have intermeshing gears 63 and 64 fast upon them, through which the shaft 57 and the roller 47 are driven from the shaft 51.

The shaft 16, which carries the patch applying segment 12, has fast upon it a gear 65 which, through an equal gear 66, drives a shaft 67 upon which the suction drum 50 and other operating mechanisms to be described are mounted.

Figure 6:
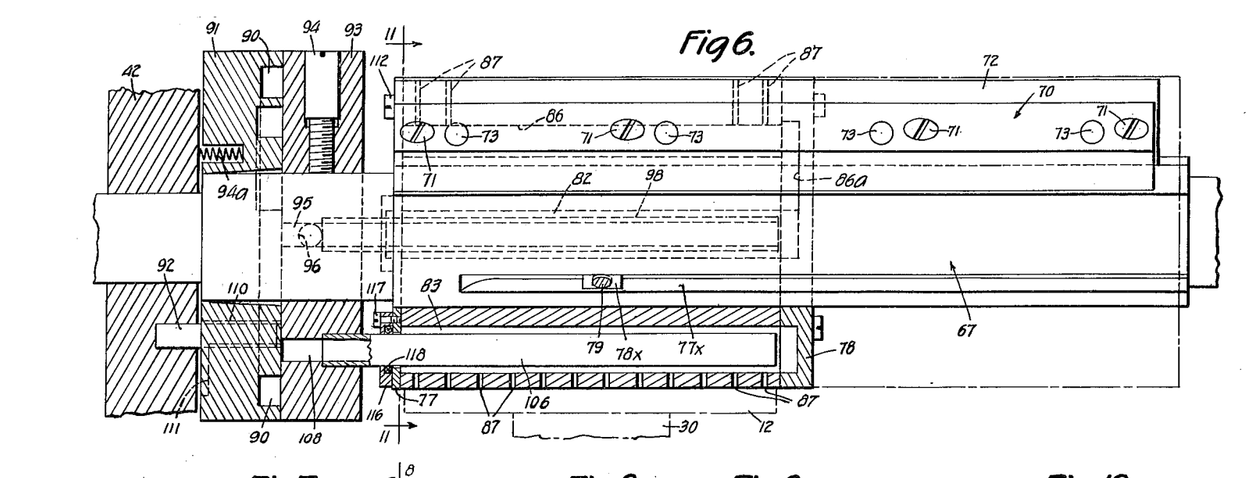
FIG. 6 is a fragmentary transverse vertical sectional view taken through the drum and associated parts on the line 6—6 of FIG. 11 looking in the direction of the arrows.
Figures 11, 12, 13, 14:
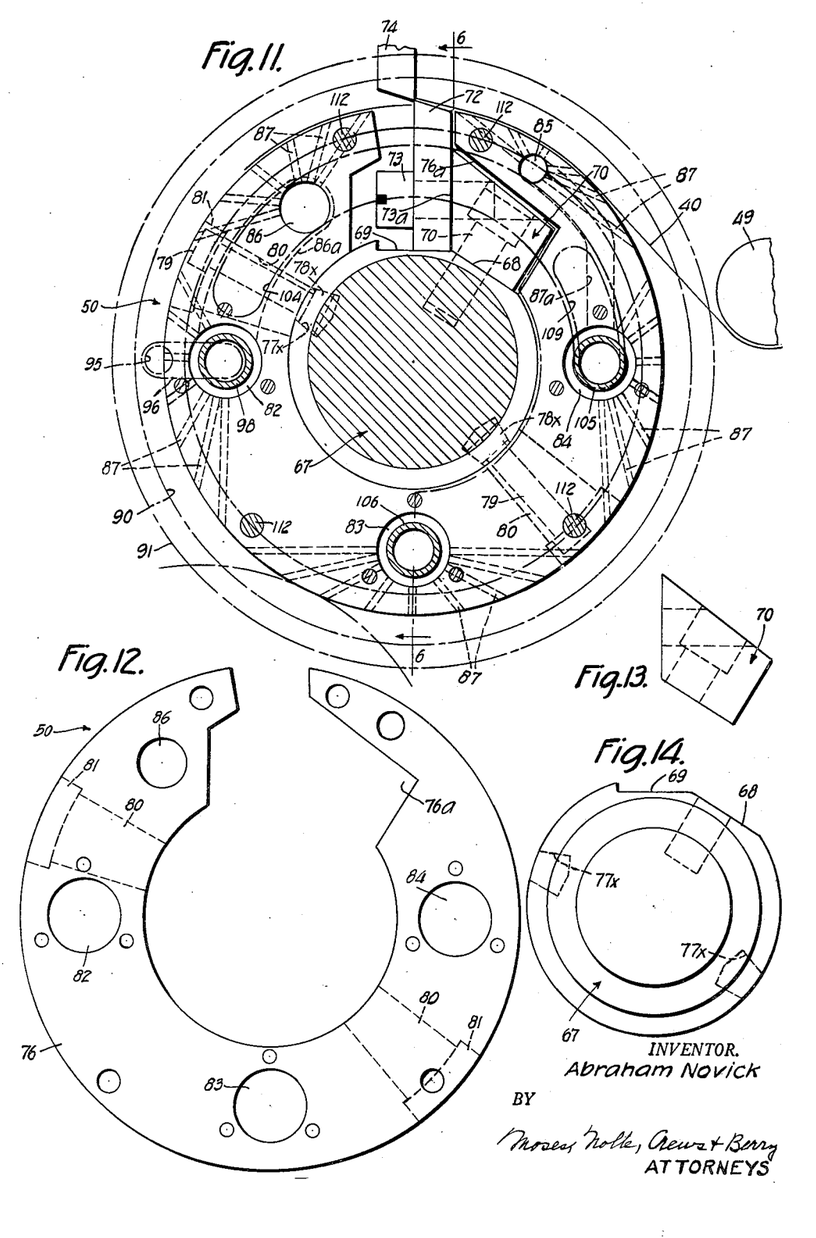
FIG. 11 is a fragmentary, transverse, sectional view taken upon line 11—11 of FIG. 6, looking in the direction of the arrows.
FIG. 12 is an an end view of the drum body as seen from the left.
FIG. 13 is a detail view in elevation of a block through which the movable knife is supported from the drum shaft.
FIG. 14 is a view of the left end of the drum shaft.

The shaft 67, as best seen in FIGS. 6, 11 and 14 is formed with flat segments 68 and 69. A knife supporting block 70, trapezoidal in cross section, is secured upon the face 68 by headed screws 71. A traveling cutting blade 72, forming one cutting element of a flying cutter, is secured against a face 73a of a block 70 by headed screws 73 whose shanks are passed freely through the blade 72 and are threaded into the block 70.

The left hand face of the blade 72 (FIG. 11) extends radially of the shaft 67 and has a cutting edge formed at its outer extremity. The cutting edge protrudes a short distance beyond the periphery of the drum 50 but on back of the cutting edge the outer face of the blade 72 slopes inward toward the periphery of the drum.

Once in each revolution the cutting edge of the blade 72 sweeps across the cutting edge of a similar stationary blade 74 to cut a patch from the leading end of the web. The blade 74 is fitted into a recess of a rigid stationary bar 75, and is affixed to the bar by screws (not shown).

The drum 50 comprises a body 76 and left and right end plates 77 and 78 (FIG. 6). The body 76 is formed with a cylindrical bore to fit the cylindrical surface of the shaft 67, and has a side cut-out 76a extending throughout its length in which the block 70, the blade 72, and the heads of screws 73 may be freely received while leaving the body 76 free for axial and circumferential adjustment relative to the shaft 67.

The body 76 is formed with numerous rows of suction passages in its periphery. Since different lengths of patch web may be fed out in a patching cycle, according to the ratio of the currently used sprockets 52, 53, the leading end of the web may extend a greater or lesser distance beyond the point of severance at the instance of severance. This is the position relative to the drum which will be retained by the severed patch as the patch is carried forward after cutting. It is important that one or another of the rows of suction passages lie beneath the leading margin of the patch in proximity to the leading end of the patch, and it is for that reason that the drum 50 is made circumferentially adjustable relative to the shaft 67 and to the traveling cutting blade 72.

The shaft 67 is formed with under-cut channels 77x having straight walls in which square nuts 78x are trapped. Headed screws 79 have their shanks passed through the body 76 and threaded into these nuts, and constitute the means for securing the drum 50 in fixed relation to the shaft. In order that there may be capacity for circumferential adjustment, a slot 80 is provided in the drum 50 for each screw 79, each slot being elongated in a circumferential direction. Each slot 80 has a widened portion 81 at its outer end to receive the screw head and to provide shoulders against which the screw head may bear inward. When it is desired to readjust the drum 50 relative to the shaft 67, the screws are only partially backed out, to permit adjustment without losing connection with the associated nuts, and are then retightened.

The drum body 76 has five longitudinal suction bores 82, 83, 84, 85 and 86, formed in it. The bores 82, 83, 84 extend through the body from end to end thereof. The bores 85 and 86 extend into the body 76 from the right end and may terminate a little short of the left end of the body. If preferred, however, the bores 85 and 86 may be extended completely through the body 76 and then plugged, or closed at the left hand end by the disc 77.

The right hand end of the suction bore 82 is constantly maintained in free communication with the right hand end of the bore 86 by a passage 86a in end plate 78 (FIGS. 6, 9, 10 and 11). Suction passages 87 which radiate from the bore 86, and suction passages 87 which radiate from the bore 82, are therefore controlled in common. At any given instance all these passages will be connected to a source of suction, or all of them will be connected to the atmosphere, or all of them will be closed off from the atmosphere and suction. By a common control member, they may be switched over simultaneously.

The drum segment reached by the passages which radiate from the bores 82 and 86 lies to the left of the movable blade 72 (as viewed in FIG. 11). At the instant of cutting the patch will always be cut off to lie upon this segment and will be conveyed by the segment to a transfer point and there delivered to the patch applying segment 12. While the segment of the drum referred to, like the other drum segments, at times exerts a slip drag upon a portion of the web which has not yet been cut off, it differs from the other drum segments in that it is the only segment which conveys and transfers a cut patch. It is, therefore, referred to herein as the conveying and transferring segment.

Figure 9:
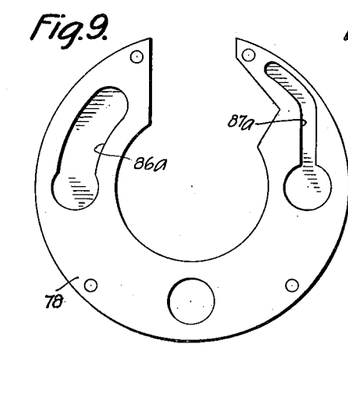
FIG. 9 is a view in elevation of the left face of a disc which covers the right hand end of the suction drum.
Figure 10:
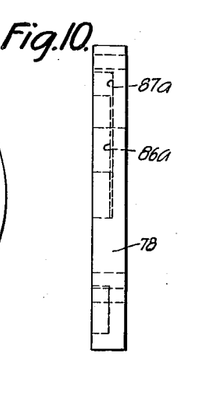
FIG. 10 is an edge view of the disc of FIG. 9.

The right end of the suction bore 84 is constantly maintained in free communication with the right end of the bore 85 by a passage 87x in the end plate 78 (FIGS. 9, 10 and 11). Suction passages 87, which radiate from the bore 85 and suction passages 87 which radiate from bore 84 are therefore controlled in common. At any given instant all these passages will be connected to a source of suction, or all of them will be connected to the atmosphere, or all of them will be cut off from both suction and the atmosphere. By a common control member, they may be switched over simultaneously.

The segment reached by the passages which radiate from the bores 84 and 85 constitutes one of two slip drag segments, so called because they perform no other function than to exert a slip drag on the unsevered web.

The other slip drag segment has passages 87 formed in it which radiate from the bore 83. The bores 83 and 84 are controlled in common and are supplied from a common source of suction, but the phases of the second slip drag segment, controlled through bore 83, begin and end 90° later than the corresponding phases of the first slip drag segment, controlled through the bore 84.

Figure 2:
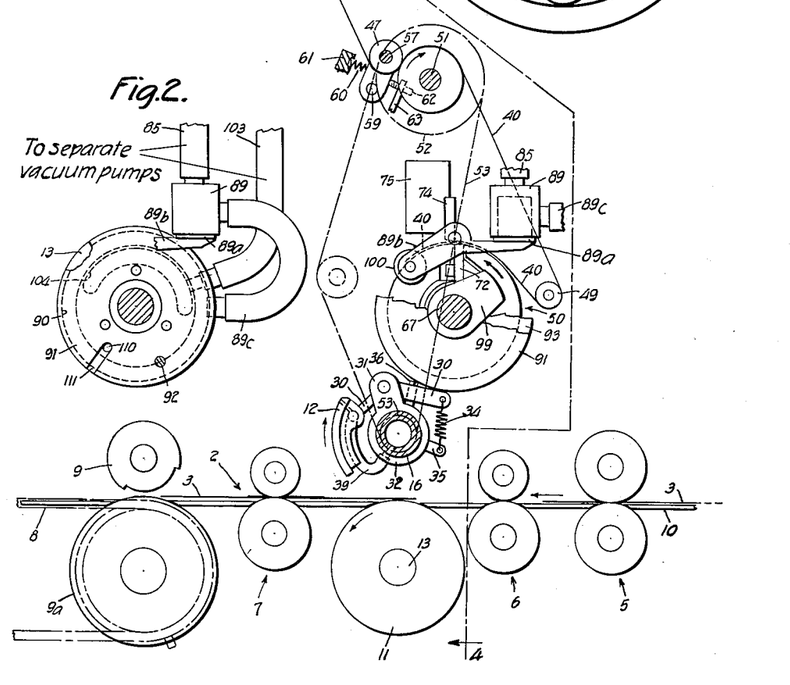
FIG. 2 is a fragmentary view showing in part suction connections leading to a suction drum which forms part of the patch severing and applying mechanism of the machine.

Separate sources of suction are provided for the conveying and transferring segment on the one hand, and for the slip drag segment on the other. A conduit 88 (FIGS. 1, 2 and 4) leads from the first source of suction, for supply suction to the conveying and transferring segment, through a chamber in a box 89. The chamber of box 89 is open at its lower side, the lower side being covered at times by a clapper valve 89a which is carried on a lever arm 89b. The chamber of the box 89 also communicates through a conduit 89c with a complete annular channel 90 which is formed in a stationary valve disc 91 near the periphery thereof.

Figure 15:
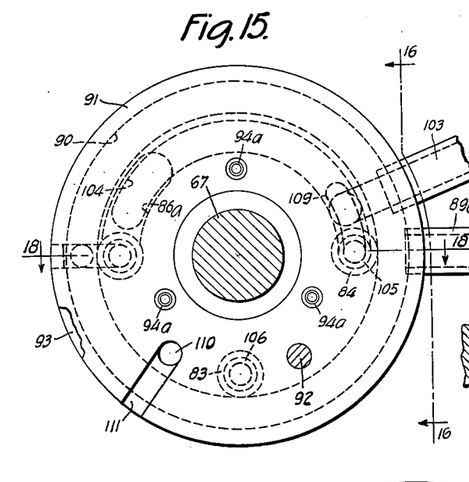
FIG. 15 is a fragmentary sectional view showing principally a stationary valve member, the view being taken upon the line 15—15 of FIG. 16, looking in the direction of the arrows.
Figure 16:
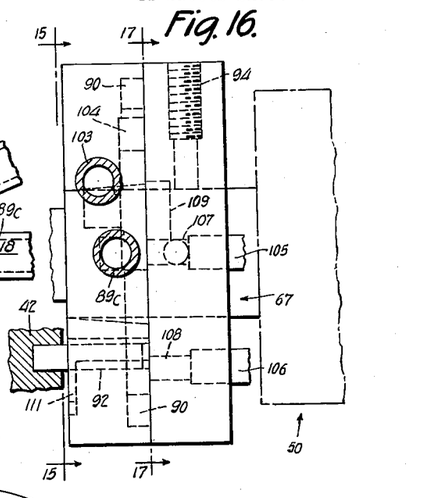
FIG. 16 is a fragmentary sectional view taken upon the line 16—16 of FIG. 15, looking in the direction of the arrows.
Figure 17:
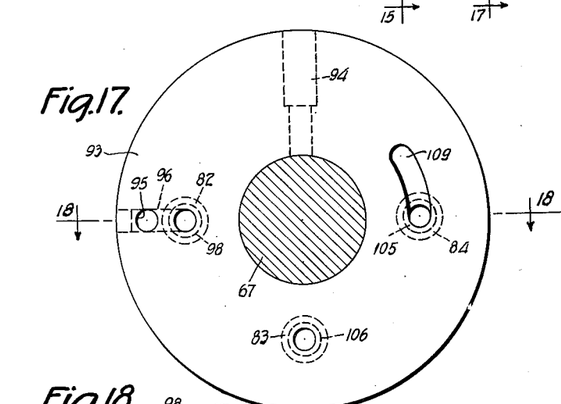
FIG. 17 is a sectional view taken upon the line 17—17 of FIG. 16, looking in the direction of the arrows.

The disc 91 is supported upon the shaft 67 and is held against rotation by a pin 92, see FIG. 16, also, which is passed through the body of the disc into the left hand auxiliary frame member 42. A rotary valve disc 93 is secured upon the shaft 67 by a set screw 94 and runs in face to face contact with the stationary valve disc 91. Springs 94a press the disc 91 toward the disc 93. The central opening through the disc 91 is made slightly conical in form to permit free face to face contact to be maintained between the discs. The annular channel 90 of the disc 91 constantly communicates through bores 95, 96 and 97 with a tube 98 (FIGS. 15, 17 and 18) and through the tube with the bore 82 of the drum body 76. The end of the tube 98 is secured in the disc 93 in a rigid and airtight manner.

Figure 19:
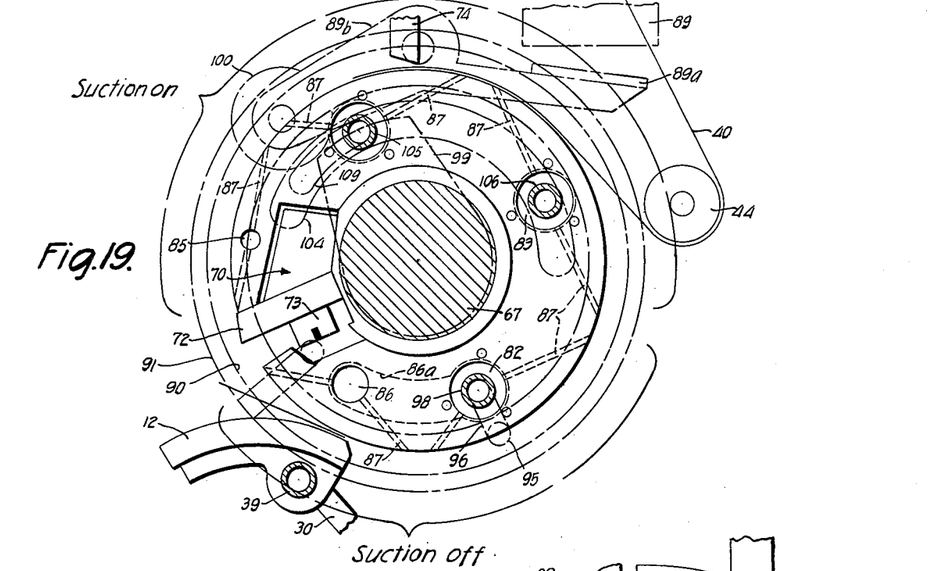
FIG. 19 is a fragmentary sectional view taken upon the line 19—19 of FIG. 5, looking in the direction of the arrows.
Figure 20:
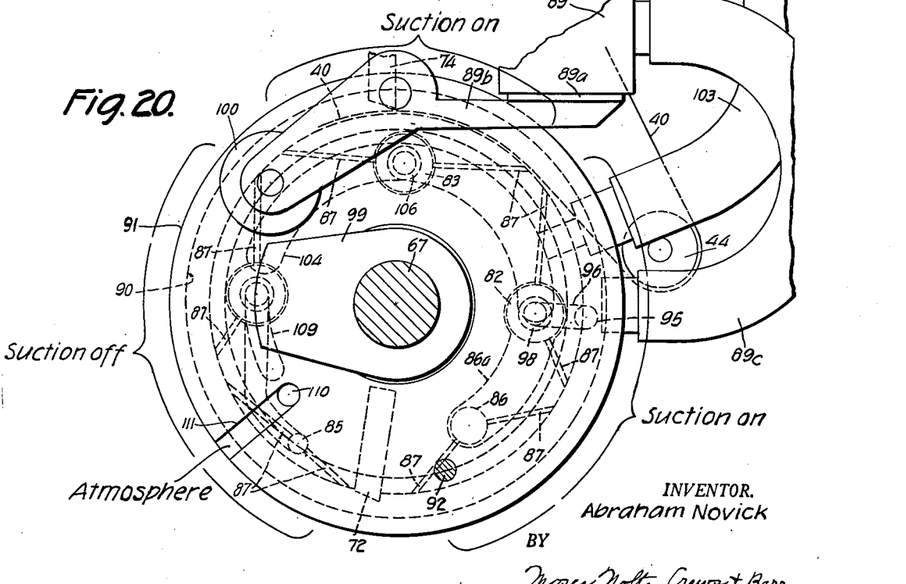
FIG. 20 is a fragmentary sectional view with portions of the frame structure omitted for clarity, the view being taken upon the line 20—20 of FIG. 4, looking in the direction of the arrows.

It is desirable that the suction passages 87 controlled from bores 82 and 86 be in communication with the source of suction at all times except during the period when the patch is being actually transferred from the drum to the applying segment 12. These passages should, however, be cut off from the suction and placed in communication with the atmosphere substantially from the instant when the leading patch margin arrives at the patch transfer point until the patch has been carried completely clear of the drum by the segment 12. Provision is made for controlling the valve 89a in the timed relation referred to through a cam 99 fast on the shaft 67 and a follower 100 carried by the lever 89b. The transfer occurs at the point of tangency of the sector 12 and the drum 50. Since the arrival of the leading margin of the patch at the point of transfer may be advanced or retarded as the patch length is varied, the cam 99 is secured on the shaft 67 with provision for angular adjustment by means of a set screw 101 (FIG. 1). As soon as the cam 99 lifts the follower 100, as in FIG. 19, the valve 89a is thrown wide open. This cuts off the conduit 89c from communication with its source of suction and places the conduit 89c in wide open communication with the atmosphere. As soon as the cam 99 clears the follower 100, as in FIG. 20, the valve 89b is again closed, and the communication of the conduit 89c with the source of suction is reestablished.

The second source of suction is connected through a conduit 103 with an inner, substantially semi-circular channel or groove 104 which is found in the right face of the stationary valve disc 91.

Figure 18:
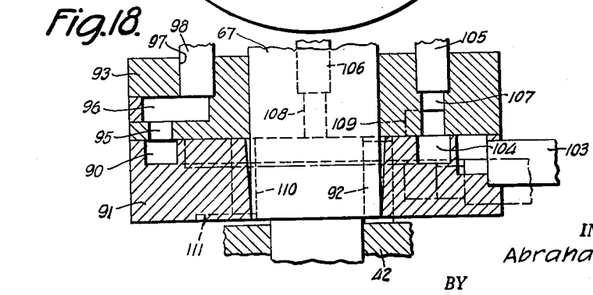
FIG. 18 is a fragmentary sectional view taken upon the line 18—18 of FIG. 15, looking in the direction of the arrows.

Tubes 105 and 106, fixed in the rotary valve disc 93, are in communication respectively with passages 107 and 108 (FIG. 18) of the rotary disc 93 which run into and out of communication with the channel 104. The tubes 105 and 106 constantly communicate, respectively, with the bores 83 and 84 of the drum body 76 through which the suction passages of the first and second slip drag segments are controlled. The passage 108 is a straight bore through the disc 93 (FIG. 18). The passage 107 is also a straight bore through the disc 93 but it communicates with a short, arcuate, forwardly reaching channel 109 formed in the left face of the disc 93. The channel 109 causes the changes of phase to occur in the first drag segment at an earlier point in the cycle than they would if the passage 107 alone were relied upon, see FIG. 20. Suction is caused to come in as the leading passages 107 which radiate from the bore 85 move into the web engaging range of their travel.

As the passages 107 and 108 run out of communication with the channel 104, they cut off the passages 87 of their respective segments from communication with the suction conduit 103. A port 110 which communicates with the atmosphere through a radial passage 111, is disposed to be crossed by the channel 109 and the opening 107, for placing the passages of the first slip drag segment in communication with the atmosphere, and to be crossed by the opening 108 for placing the passages of the second slip drag segment in communication with the atmosphere. The atmosphere is not admitted to either slip drag segment until after the passages thereof have been cut off from communication with the source of suction. Admitting air to the passages of one slip drag segment does not impair the suction effect in the other slip drag segment.

There is no fixed location for the window in a window envelope. In order to avoid waste of suction, it is desirable that the drum be limited to a length not substantially greater than the width of the patch web. It is important, therefore, that the feed zone of the patch web be capable of variation, and that the flying cutter be capable of severing patches from the web in any feed zone. The cutter blades are accordingly made long enough to cover all available feed zones, but, because the drum is limited in length substantially to the width of the patch web, the drum is made axially adjustable. The provision for adjusting the drum 50 relative to the shaft 67 has already been described. It consists of headed screws 79 and the nuts 78x which are trapped in the undercut channels 77x of the shaft 67. When the screws 79 are loosened the drum may be shifted axially, moving the screws with it and nuts longitudinally of the shaft, along the channels 77x. Re-tightening of the screw fixes the drum in its new adjusted position.

Figure 3:
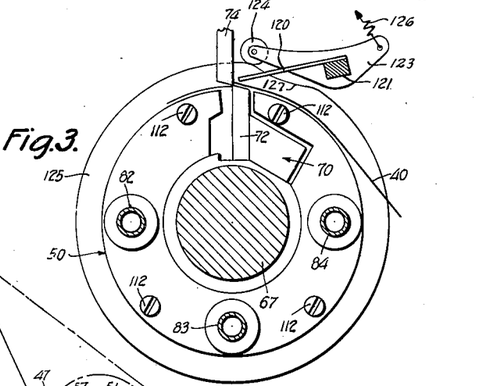
FIG. 3 is a sectional view illustrating the suction drum, the severing knives and a device for preventing obstruction of a freshly cut leading end of the web by the stationary knife, the section being taken on the line 3—3 of FIG. 5, looking in the direction of the arrows.
Figure 7:
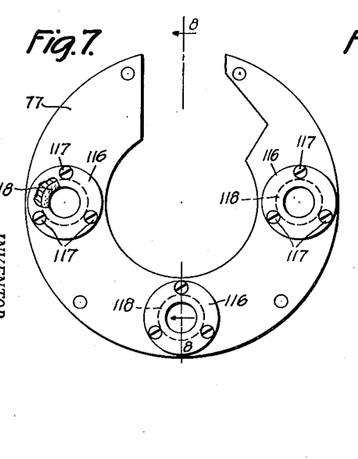
FIG. 7 is a view in elevation of an end disc which covers the left hand end of the suction drum.
Figure 8:
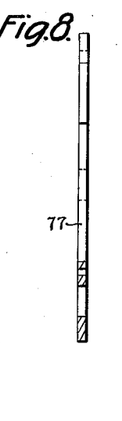
FIG. 8 is a sectional view of the disc of FIG. 7, the section being taken on the line 8—8 of FIG. 7 looking in the direction of the arrows.

In order that the drum 50 may have capacity for longitudinal adjustment toward and from the rotary valve disc 93, the connections between the drum and the disc are made telescopic, the telescopic joints being sealed at the end disc 77. The disc 77 is secured to the drum body 76 by screws 112, FIGS. 3, 6 and 7, with openings 113, 114 and 115 in axial alignment, respectively, with the bores 82, 83 and 84. Over each bore a recessed closure cap 116 is secured by screws 117. Each cap contains in its recess a washer 118 which snugly fits the inserted tube and which is firmly pressed against the disc 77 through screw pressure applied by the cap 116.

Means are provided for adjusting the segment 12 longitudinally of shaft 16 and for controlling the supply of suction to the segment 12 in various adjusted positions. Set screws 102 are threaded through the collar 32 into abutting relation with the base of a shallow groove 102d formed in the shaft 16, so that the collar 32, and the segment 12 which is carried by the collar, may be adjusted along the shaft without loss of a desired phase relationship. The hose 39 is connected to the interior of the shaft 16 through a tapered threaded nipple 39d. The nipple may be screwed into any one of a series of threaded bores which are provided at intervals along the shaft 16. The bores not actively in use for a given setup are plugged by tapered threaded plugs 39e. When a new adjustment is desired the hose 39 is temporarily detached from the nipple 39d, the nipple is exchanged with a selected one of the plugs 39e, the collar 32 is adjusted, and the hose is reconnected to the nipple.

Figure 26:
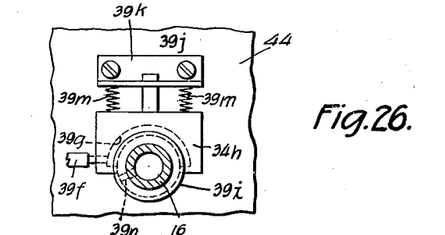
FIG. 26 is a sectional view taken upon the line 26—26 of FIG. 4, looking in the direction of the arrows.

Mechanism for connecting the interior of the shaft 16 with suction and with atmospheric air in alternation and in properly timed relation is shown in FIGS. 4 and 26. A suitable source of suction (not shown) is connected through a hose 39f with an arcuate groove 39g in a block 39h. The block 39h, which has an arcuate recess in its lower face, bears downward between flanges of a grooved collar 39i which is fast on the hollow shaft 16. The block 39h partially embraces the grooved collar 39i. The block 39h is held against rotation by a stem 39j which extends upward through a fixed bracket 39k. Compression coil springs 39m interposed between the bracket 39k and the block 39h hold the block firmly down against the collar 39i, causing the fit of the block against the collar to be improved rather than impaired by wear. A bore 39n is provided through the collar 39i and the hollow shaft 16 in position to cause the shaft to be placed in communication with the source of suction just as the suction passages in the segment 12 reach the line of centers of the segment 12 and the drum 50, and to be placed in communication with the atmosphere just as the suction passages in the segment 12 reach the line of centers of the segment 12 and the roller or bed cylinder 11.

When the length of patch is to be altered the sprockets 52 and 53 are replaced as has been described. This causes a greater or lesser length of patch to be delivered in a cycle, and hence affects the time at which the leading end of the patch will reach the transfer point. It is necessary, thereafter, to adjust the shaft 16 together with the valve collar 39i and the segment 12 angularly so as to cause the suction passages of the segment 12 to arrive at the transfer point earlier or later as required. For this purpose the set screw 16x is backed outward far enough to permit the shaft 16 to be turned relative to the gear 15. When the desired adjustment has been effected the set screw 16x is re-tightened.

Since the gears 65 and 66 are constantly engaged with one another, adjustment of shaft 16 produces an equal adjustment of the shaft 67, and of the drum 50, and the knife blade 72 which are fast upon the latter shaft. The length of patch is not affected by the adjustment of the knife blade 72, since one patch is cut for each cycle, as before. When the phase adjustment of the shaft 16 has been accomplished, the body of the drum 50 is adjusted angularly with reference to the shaft 67 in the manner heretofore described, if such adjustment is then found to be desirable.

At each patch cutting or severing operation the freshly cut web end rests on the highest portion of the traveling cutter blade 72 in position to be necessarily obstructed against further advance by the stationary blade. As the traveling blade moves forward rapidly and the web is advanced slowly, a receding portion of the movable blade 72 travels beneath the stationary blade 74 creating a clearance through which the web may pass. Since the blade is initially obstructed, however, there would be danger of its leading end being held up and deflected away from the drum by the stationary blade if provision to the contrary were not made.

Figure 5:
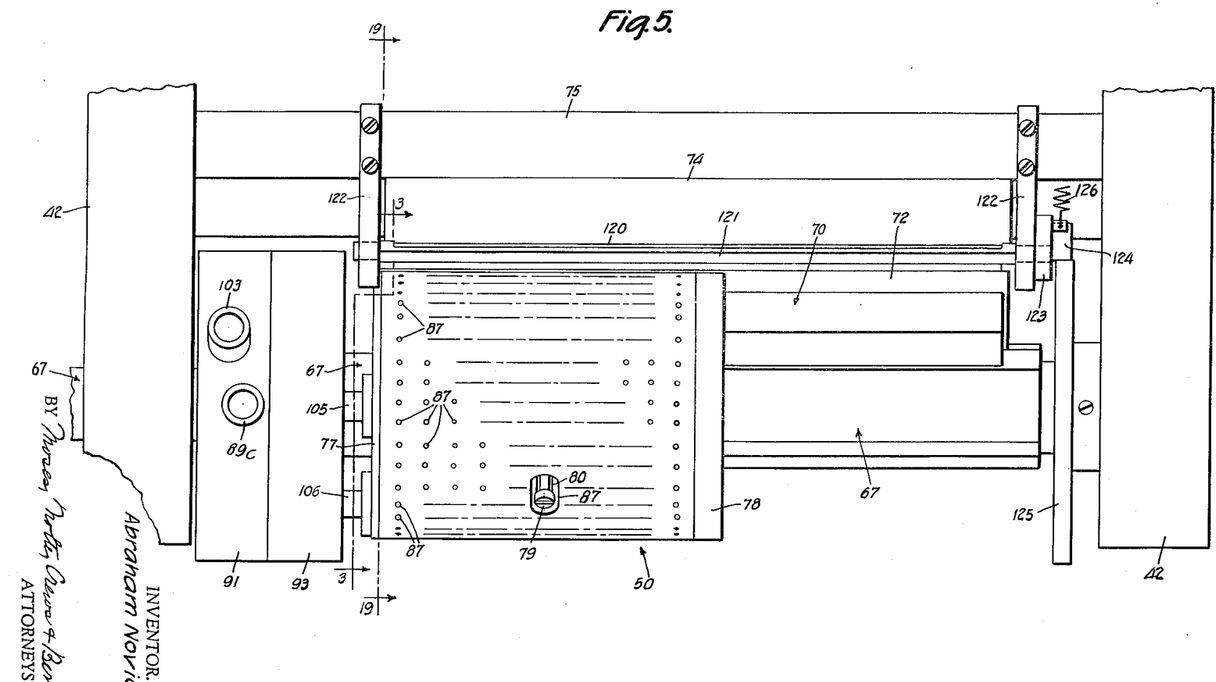
FIG. 5 is a fragmentary sectional view showing a portion of the structure of FIG. 4 on a larger scale, the section plane being the same.

To prevent such undesirable obstruction of the web, a web end stripper blade 120 (FIGS. 3 and 5) is provided to strip the leading end of the web off the face of the stationary blade 74. The end stripper blade 120 is secured upon a rock shaft 121. The rock shaft 121 is rockably mounted in brackets 122 which are affixed to the supporting bar 75 of the stationary cutting blade 74. A rocking arm 123, fast on the shaft 121, supports a cam follower roller 124 which is cooperative with a cam 125 fast on the shaft 67. A tension coil spring 126, connected to the tail of the lever 123 and to a fixed part of the frame, urges the lever in a direction to carry the follower 124 and the free edge of the blade 120 toward the shaft 67. The cam 125 is generally circular in form but has a shallow recessed segment 127 of slight angular extent.

Normally the follower 124 rides on the circular part of the cam periphery, holding the edge of the blade 120 clear of the drum 50 and of the web 40 on the drum. The segment 127 comes opposite the roller just before the cutting blade 72 reaches cutting position. This permits the edge of the blade 120 to press the web down against the upper face of the cutting blade 72. As the cutting blade 72 moves forward from the cutting position, the portion of its outer face opposed to the edge of the plate 120 recedes toward the axis of the shaft 67. The blade 120 follows downward, keeping the web pressed against the upper face of the movable cutting blade, thereby shifting it clear of the stationary cutting blade 74. The segment 127 does not permit the edge of the blade 120 to dip below the normal periphery of the drum 50. The blade 120 is desirably made of a comparatively soft plastic material such as Lucite.

In the embodiment of FIGS. 21 to 25, all of the operating mechanism thus far described is retained without alteration, save that the blank feeding rollers 5, 6 and 7 are replaced and the bed cylinder or roller 11a is reduced in length as compared with the roller 11 and is made adjustable longitudinally of its shaft 13a by means of a set screw 128.

Figure 3A:
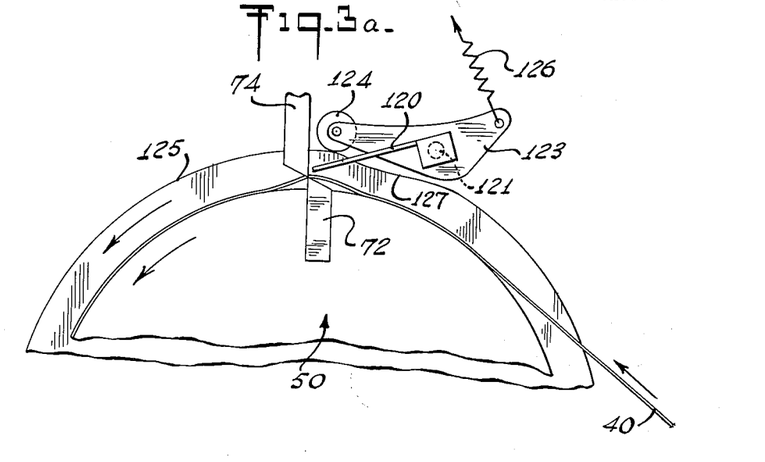
FIG. 3a is a greatly enlarged fragmentary sectional view similar to FIG. 3 indicating the position of the end stripper blade prior to its movement to strip the web from the stationary cutter blade.
Figure 3B:
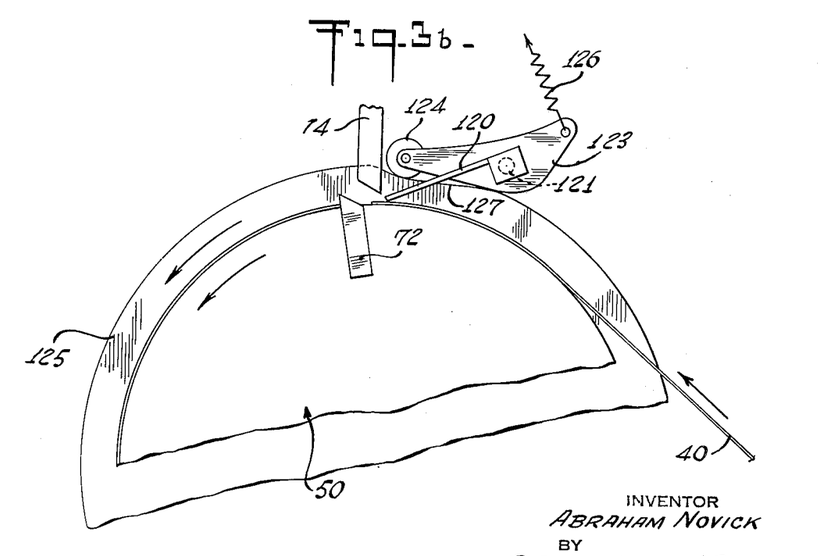
FIG. 3b is a view similar to FIG. 3a but indicating the stripper blade in position just after it has become operative to move the end of the web off the surface of the stationary cutter blade to permit clearance of the web beneath the blade.

In FIG. 3a it can be seen that the cam follower 124 rides on the outer periphery of the cam 125 and holds the end stripper blade 120 above the web 40. The drum 50 then rotates to cause the moving blade 72 to move beyond the stationary blade 74 as indicated in FIG. 3b. At this point the follower 124 has moved into the recessed segmental area 127 causing the rocker arm 123 to move counterclockwise as indicated in FIGS. 3a and 3b. This causes the blade 120 to strip the web from the stationary blade 74 and hold the web onto the drum 50 to permit the web to clear the blade.

The mechanism of FIGS. 21 to 25 is designed to handle a wide variety of blanks, including blanks which are unusually short and unusually narrow. To this end a belt feeder is provided for carrying the blanks through the patch applying station, the feeder being of the kind disclosed in Letters Patent of the United States No. 2,191,505, dated February 27, 1940. The belts are desirably made independently laterally adjustable so that they may engage the blanks at opposite ends of the window opening and in proximity to the window opening if desired. Since the roller 11a must lie between the right and left hand belts it is reduced in length to the length of the segment 12 and the drum 50, that is, to a length slightly greater than the width of the widest patch web to be employed.

At each side of the machine there is provided an upper belt 130 and an opposed lower belt 131. The upper belt 130 runs upon end pulleys 132 and 133, the former of which is driven. Shafts 134 and 145 extend between the main frame members 43a and 44a and support the respective pulleys 132 and 133 with capacity for adjustment along the shafts. The shaft 134 drives the pulley 132 through a key 136. The lower belt 131 runs upon end pulleys 137 and 138, the former of which is driven. Shafts 139 and 140 extend between the main frame members 43a and 44a and support the respective pulleys 137 and 138 with capacity for adjustment along the shaft. The shaft 139 drives the pulley 137 through a key 141.

The upper or active stretch of each lower belt 131 is supported on rollers 142 which are mounted on bosses 143 on a bracket 144. The rollers 142 are disposed along an arc of large radius and therefore cause the active stretches of the belts 130 and 131 to be guided along arcs of large radius. This causes the blank to be gripped between the belts at each point of its travel between the belts. Provision is made for adjusting each bracket 144 laterally of the machine, independently of the other bracket 144, and for causing each bracket to compel the associated belts 130 and 131 together with the driving, guiding and tensioning pulleys therefor to be adjusted in unison with itself.

The brackets 144 are supported with capacity for sliding movement upon a rectangular bar 145 which extends across the machine. Each bracket 144 is formed with a downwardly facing channel 146, rectangular in cross section, which partially embraces and fits the bar 145. A complementary plate or strip 146 extends beneath the bar 145 and is secured to the bracket 144 in any suitable manner, as by screws (not shown). Each bracket 144 is provided with a set screw 147 which may be screwed against the bar 145 to fix the bracket in place when a desired adjustment has been secured. When the bracket is to be readjusted the set screw 147 is temporarily backed out a short distance.

At each side of the machine an operating screw 148 is provided for the associated bracket 144. The screw 148 is formed with a polygonal head for engagement by a wrench and is passed through the associated main frame member, being secured against longitudinal movement by collars 149 and 150 which are affixed on the screw body at opposite sides of the frame member. The inner end of the screw is threaded through the associated bracket 144 and serves by its rotation to adjust the bracket along the bar 145.

Figure 21:
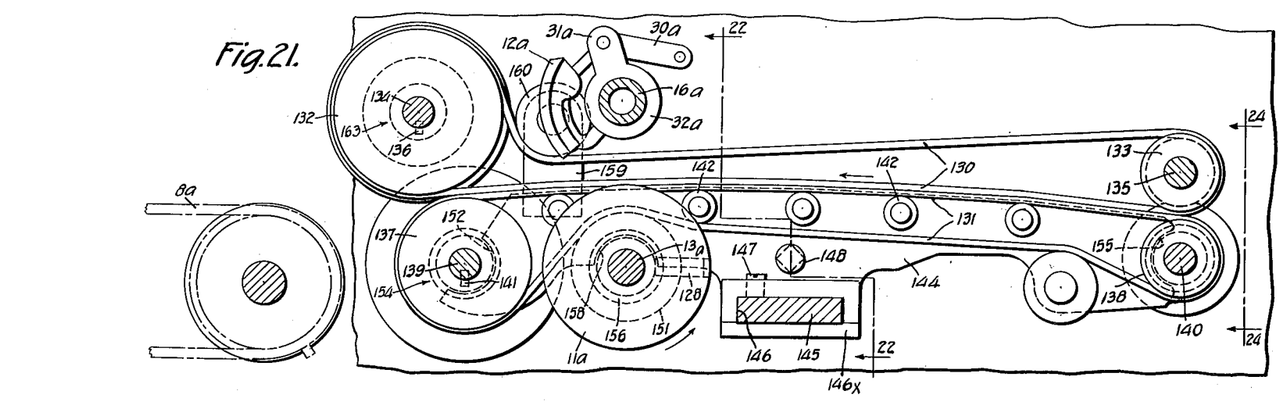
FIG. 21 is a fragmentary view in sectional elevation showing the blank conveying belts and associated mechanism.
Figure 22:
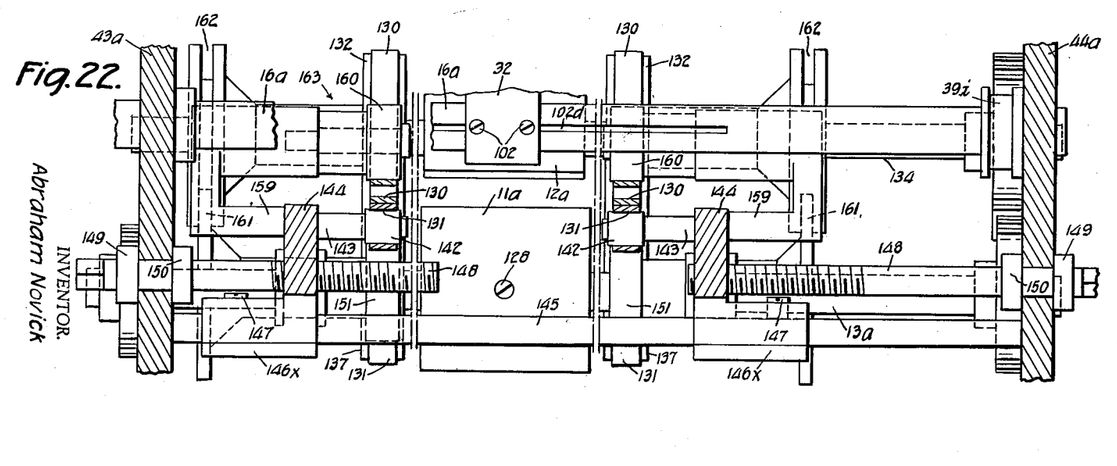
FIG. 22 is a sectional view taken upon the line 22—22 of FIG. 21 looking in the direction of the arrows.

The bracket 144 directly controls the lateral position of the end pulleys 137 and 138 and of an intermediate guide pulley 151 which is mounted on the shaft 13a. The bracket 144 at its forward end is provided with an arcuate recessed portion 152 which extends into a groove 153 (FIG. 23) formed in a hub portion 154 of the pulley 137. Similarly, the bracket 144 includes an arcuate recessed portion 155 which fits into a groove 156 (FIG. 24) formed in a hub portion 157 of the pulley 138. The bracket 144 also has an arcuate recessed portion 158 which fits into a groove of a hub portion of the guide pulley 151 (FIG. 21). The bracket 144 provides a goose neck support 159 (FIG. 23) for an upper guide roller 160 which bears against the upper or inactive stretch of the upper belt 130. The roller 160 is adjusted in unison with the bracket 144.

Figure 23:
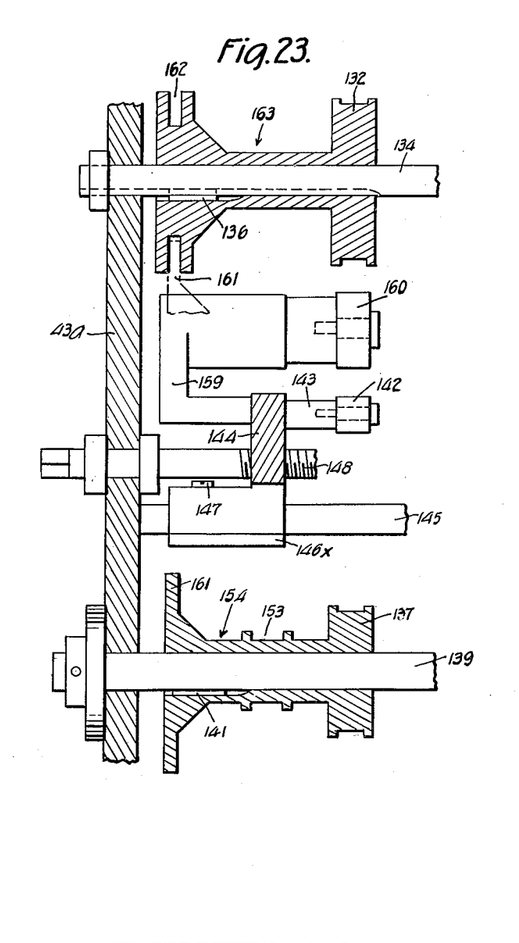
FIG. 23 is a fragmentary staggered sectional view with certain of the parts shown spread out for revealing details of construction which would otherwise be obscured, and with one of the parts partially repeated.
Figure 24:
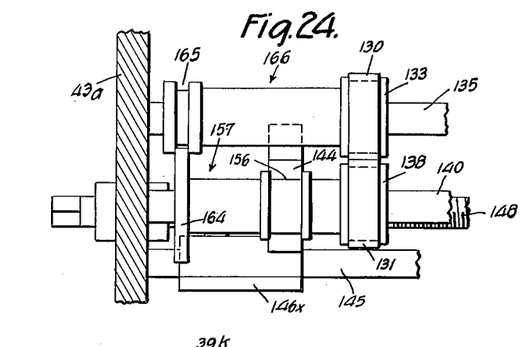
FIG. 24 is a fragmentary sectional view taken upon the line 24—24 of FIG. 21, looking in the direction of the arrows.

The upper pulleys 132 and 133 are adjusted by, and in unison with, the lower pulleys 137 and 138. The hub portion 154 of the pulley 137 is provided with a flange or disc 161 (FIG. 23). The disc 151 extends into a grooved part 162 of the hub 163 of pulley 132, compelling adjustment of the pulley 132 in unison with the pulley 137. Similarly, a disc or flange 164 (FIG. 24) on the hub 157 of pulley 138 extends into a grooved part 165 of the hub 166 of pulley 133. It will be evident from the description given that the left hand bracket 144 adjusted as a unit the left hand belts 130 and 131 together with the guiding, supporting and driving pulleys and rollers for said belts, and that the right hand bracket 144 adjusts as a unit the right hand belts 130 and 131 together with the guiding, supporting and driving pulleys and rollers for the latter belts.

Figure 25:
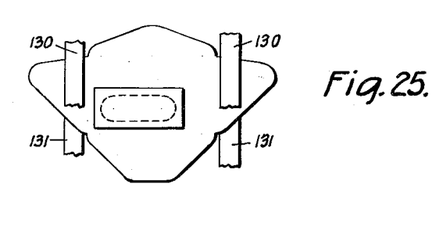
FIG. 25 is a fragmentary plan view showing the relation of the blank feeding belts to an associated blank.

In FIG. 25 the relationship of the right and left belts 130 and 131 to a typical envelope blank is illustrated in plan. In this instance, the body of the blank is considerably longer than the window opening and the end flaps are fairly long. The belts are therefore set to engage the end flaps just beyond the ends of the envelope body. The machine is capable, however, of handling envelopes whose bodies are little longer than the window, in which case the belts would still be adjusted to engage the end flaps immediately adjacent the ends of envelope body, but would be considerably closer together than in FIG. 25. It is not essential that the belts be disposed beyond the ends of the envelope body. In connection with envelopes having very short end flaps, the belts may be set to engage the envelope body itself adjacent one or both ends of the window. In either instance, however, the belts are disposed beyond the ends of the roller 11a, and the sector 12a.

Figure 27:
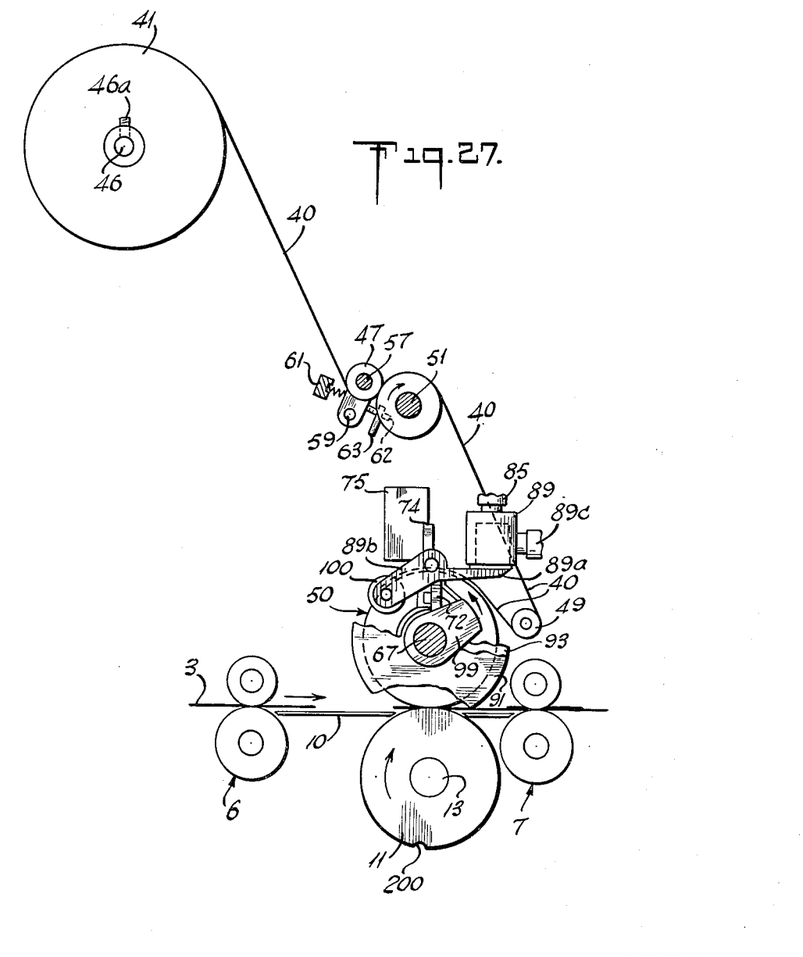
FIG. 27 is a fragmentary view in sectional elevation similar to FIG. 1, but taken on the opposite side of the apparatus therefrom, and showing the embodiment of the present invention wherein patches are applied directly to envelope blanks by the section drum.

The embodiment shown in Fig. 27, with which this application is particularly concerned, includes operating parts previously explained and numerically designated as indicated. Portions of the mechanisms have been displaced to permit use of the suction drum 50 as an applicator to apply patches to each envelope blank as it is advanced.

In the embodiment shown in Fig. 27, the suction drum, together with the parts associated therewith and normally operating therewith above the table 10, are displaced in the machine frame construction downwardly to position the peripheral surface of the suction drum 50 in rolling contact with the roller 11. The segment applicator 12, and its associated mechanism, is not used. The blanks 2 are fed between the couples 6 as before. (Here the feed is indicated from left to right being shown on the opposite side of the apparatus from that indicated in Fig. 1.)

Envelope patches which have been cut by the flying cutter blade 72 in the same manner as described previously, are held by suction to the suction drum 51 and transferred therearound from the cutting location into alignment with blanks 3, the latter being advanced between the roller 11 and the drum 50. In order to permit the flying cutter blade 72 to clear the roller 11, the latter is notched as at 200 to provide for this blade clearance. The timing is such that the blanks will not be damaged thereby. It should be appreciated that in order to mount the parts as described in the embodiment of Fig. 27, suitable provision must be made to locate shaft 67, with the suction drum 50 thereon, in a suitable frame mounting to align the drum 50 over the roller 11. Means would also be provided to permit driving rotation of the shaft 67 from the gears 15 and 65 on the segment shaft 16, or directly from gear 14 on shaft 13. Any suitable gearing combination which will effect the correct drum speed and the location of the operating parts is effective.

Patches, which have been severed by the flying cutter 72, are held by suction to the drum 50 as described previously for the other embodiments. As the envelope blanks are advanced between the drum 50 and the roller 11, a patch, carried around on the drum 50 from the cutter station, is applied to an envelope blank. The suction control operates as before to release the patch at the nip of the mating drum 50 and the roller 11 and apply it to an advancing blank.

While a specific embodiment of the invention has been shown and described in detail to illustrate the application of the invention principles, it will be understood that the invention may be embodied otherwise without departing from such principles.

What is claimed is:

1. A blank patching mechanism comprising, in combination, a suction drum, means driving the drum at a constant peripheral speed, means for paying out a web of patch material to the drum at a lesser constant speed so that the drum exerts a slip drag on the web, and means for severing patches from the leading end of the slow moving patch web on the drum at a severing station, the drum being divided into a patch conveying and transferring segment and a plurality of slip drag segments, suction control means maintaining suction in the patch conveying and transferring segment continuously except for a brief transfer interval, and suction control means maintaining suction in the slip drag segments throughout their travel in the web engaging range of travel.

2. A blank patching mechanism comprising, in combination, a suction drum, means driving the drum at a constant peripheral speed, feeding means for paying out a web of patch material to the drum at a lesser constant speed so that the drum exerts a slip drag on the web, a flying cutter including traveling and stationary blades for severing patches periodically from the leading end of the patch web on the drum, said patch web feeding means including change speed gearing for changing the length of patch web payed out between cutting operations, a rotary patch applying suction segment running substantially tangent to the drum at a patch transfer point, a drive gearing for said segment, means releasably connecting said drive gearing with said segment so that the segment can be advanced or retarded in phase relative to the drive gearing as the length of patch furnished in a cycle is increased or diminished, and valve means controlling the alternate admission of suction and atmospheric air to the suction segment, said valve means being connected to the segment for phase adjustment in unison therewith.

3. A blank patching mechanism comprising, in combination, mechanism for feeding blanks at uniform speed past a patching station, a suction drum, means driving the drum at a constant peripheral speed equal to that of the blanks, feeding means for paying out a web of patch material to the drum at a lesser constant speed so that the drum exerts a slip drag on the web, a flying cutter including a stationary blade and a cooperating rotary blade, the latter driven in unison with the suction drum, for severing patches periodically from the leading end of the slow moving patch web on the drum, a rotary suction segment running at the speed of the blanks for taking over each patch from the drum at a transfer point and rolling it onto a moving blank, and a bed cylinder opposed to the suction segment, the cutting blades being long enough to cover any one of the variety of zones of web and patch feeding, but the drum, the segment and the bed cylinder being all of substantially less length than the blades, means for securing the drum, the segment and the bed cylinder in different positions of adjustment transversely of the mechanism, the blank feeding mechanism comprising pairs of opposed belts engageable with the blanks outside the lateral bounds of the segment and the bed cylinder, and means for independently adjusting the belt pairs transversely of the machine.

4. A blank patching mechanism comprising, means for advancing sheet material to be patched, means for feeding patch web material, a suction drum onto which the leading end of the patch web material is delivered, a flying cutter comprising a first knife set into and rotatable with said suction drum, and a second stationary knife cooperative with said first knife to cut a patch from the leading end of the patch web material, said suction drum including suction means for holding the cut patch onto the drum until it is brought into position in alignment with the sheet material to be patched and thereafter releasing said patch for application to said sheet material, and means for deflecting the end of the patch web downwardly against said suction drum and away from said stationary blade immediately after a patch has been cut therefrom.

5. A blank patching mechanism according to claim 4 wherein said deflecting means includes a cam rotatable with said drum and having a recessed segmental portion, a rocker arm including a cam follower at one end biased into contact with said cam, a stripper blade on said rocker arm extending toward said stationary blade, said recessed portion being located and said stripper blade being of a size to cause said blade to move against the free end of said web immediately after a patch of material has been cut and to direct said web against said suction drum and to hold it onto said drum until the web clears said stationary blade.

6. A blank patching mechanism comprising, in combination, means for advancing at uniform speed sheet material to be patched, means for feeding the patch web at a uniform speed less than that of the material to be patched, a suction drum onto which the leading edge of the patch web is delivered, means driving the suction drum at a constant surface speed equal to the speed of the material to be patched so that the suction drum exerts a slip drag on the leading end of the patch web, and a flying cutter comprising a first knife comprising a rigid blade set into but extending outwardly from the periphery of and rotatable with the suction drum and having its cutting edge permanently projecting above the periphery of the suction drum and a rigid stationary knife extending downwardly toward the periphery of said drum and having its cutting edge minutely spaced from the cutting edge of said first knife when the latter is in alignment therewith and being cooperative with said first knife to cut a patch from the leading end at a cutting station, said second knife having its cutting edge spaced from the periphery of said drum to allow the free passage of the leading edge of the said patch web and the material of said web to pass freely between the surface of the suction cylinder and the stationary knife, and suction control means for causing the patch to be carried by the suction drum from the cutting station for application to said sheet material, and means for deflecting the end of a patch web downwardly against said suction drum and away from said stationary blade immediately after a patch has been cut therefrom.

7. A blank patching mechanism comprising, in combination, means for advancing at uniform speed sheet material to be patched, a support for a reel of patch web, feed rolls for drawing the patch web from the reel and paying it out at a uniform speed less than that of the material to be patched, a suction drum onto which the leading end of the patch web is delivered, means driving the suction drum constantly at a surface speed equal to the speed of the material to be patched so that the suction drum exerts a slip drag on the leading end of the patch web, a flying cutter comprising a first knife set into and rotatable with the suction drum and having its cutting edge permanently projecting above the periphery of the suction drum and a second rigid stationary knife cooperative with said first knife to cut a patch from the leading end of the slowly moving web at a cutting station, said second knife having its cutting edge spaced from the periphery of said drum to allow the free passage of the leading edge of said patch web and the material of said web to pass freely between the surface of the suction cylinder and the stationary knife, a rotary suction patch applying segment running tangential to the suction drum and to the patch of the material to be patched, means driving the applying segment uniformly at the speed of the material to be patched, suction control means for causing the patch to be carried by the suction drum from the cutting station to a transfer point and to be there transferred from the suction drum to the patch applier, and means for preventing obstruction of a freshly cut web end by the stationary knife, comprising a rock shaft, a web pressing blade carried by the rock shaft just in advance of the stationary knife, spring means constantly urging the blade toward the drum except during a short period beginning just prior to the cutting operation and terminating soon after the cutting operation.

8. A blank patching mechanism comprising, in combination, means for advancing at uniform speed sheet material to be patched, a support for a reel of patch web, feed rolls for drawing the patch web from the reel and paying it out at a uniform speed less than that of the material to be patched, a suction drum onto which the leading end of the patch web is delivered, means driving the suction drum constantly at a surface speed equal to the speed of the material to be patched so that the suction drum exerts a slip drag on the leading end of the patch web, a flying cutter comprising a first knife set into and rotatable with the suction drum and having its cutting edge permanently projecting above the periphery of the suction drum and a second rigid stationary knife cooperative with said first knife to cut a patch from the leading end of the slowly moving web at a cutting station, said second knife having its cutting edge spaced from the periphery of said drum to allow the free passage of the leading edge of said patch web and the material of said web to pass freely between the surface of the suction cylinder and the stationary knife, a rotary suction patch applying segment running tangential to the suction drum and to the material to be patched, means driving the applying segment uniformly at the speed of the material to be patched, suction control means for causing the patch to be carried by the suction drum from the cutting station to a transfer point and to be there transferred from the suction drum to the patch applier, said movable and stationary knives being much longer than the suction drum, the suction drum and the movable knife being mounted upon a common driving shaft, and means for adjusting the suction drum axially of its shaft and relative to the knives, said mechanism further including stationary and rotary valve discs for controlling the application and the cutting off of suction to the suction drum, and telescoping connections between the rotary valve discs and the drum.

9. A blank patching mechanism comprising, in combination, means for advancing at uniform speed sheet material to be patched, a support for a reel of patch web, feed rolls for drawing the patch web from the reel and paying it out at a uniform speed less than that of the material to be patched, a suction drum onto which the leading end of the patch web is delivered, means driving the suction drum constantly at a surface speed equal to the speed of the material to be patched so that the suction drum exerts a slip drag on the leading end of the patch web, a flying cutter comprising a first knife set into and rotatable with the suction drum and having its cutting edge permanently projecting above the periphery of the suction drum and a second rigid stationary knife cooperative with said first knife to cut a patch from the leading end of the slowly moving web at a cutting station, said second knife having its cutting edge spaced from the periphery of said drum to allow the leading edge of said patch web and the material of said web to pass freely between the surface of the suction cylinder and the stationary knife, a rotary suction patch applying segment running tangential to the suction drum and to the patch of the material to be patched, means driving said patch applying segment uniformly at the speed of the material to be patched, suction control means for causing the patch to be carried by the suction drum from the cutting station to a transfer point and to be there transferred from the suction drum to the patch applier, said suction drum being divided into a patch conveying and transferring segment and a plurality of slip drag segments, the suction control means referred to including control means acting on the supply of suction to the conveying and transferring segment, and in which further suction control means is provided for causing suction to be applied in the slip drag segments as they travel in the web contacting range of movement and to be cut off at other times.

10. A blank patching mechanism as set forth in claim 9 in which distinct and independent sources of suction are provided for the patch conveying and transferring segment and for the slip drag segments.

11. A blank patching mechanism comprising, in combination, means for advancing at uniform speed sheet material to be patched, a support for a reel of patch web, feed rolls for drawing the patch web from the reel and paying it out at a uniform speed less than that of the material to be patched, a suction drum onto which the leading end of the patch web is delivered, means driving the suction drum constantly at a surface speed equal to the speed of the material to be patched so that the suction drum exerts a slip drag on the leading end of the patch web, a flying cutter comprising a first knife set into and rotatable with the suction drum and having its cutting edge permanently projecting above the periphery of the suction drum and a second rigid stationary knife cooperative with said first knife to cut a patch from the leading end of the slowly moving web at a cutting station, said second knife having its cutting edge spaced from the periphery of said drum to allow the leading edge of said patch web and the material of said web to pass freely between the surface of the suction cylinder and the stationary knife, a rotary suction patch applying segment running tangential to the suction drum and to the material to be patched, means driving the applying segment uniformly at the speed of the material to be patched, suction control means for causing the patch to be carried by the suction drum from the cutting station to a transfer point and to be there transferred from the suction drum to the patch applier, said suction drum being divided into a patch conveying and transferring segment and a plurality of slip drag segments, the suction control means referred to including control means acting on the supply of suction to the conveying and transferring segment, and in which further suction control means is provided for causing suction to be applied in the slip drag segments as they travel in the web contacting range of movement and to be cut off at other times, the first mentioned suction control means including a conduit normally in communication with the conveying and transferring segment, and valve means associated with said conduit and operable at the instant of patch control transfer to open wide communication of the conduit with the atmosphere while abruptly breaking communication of the conduit with the source of suction, and to reestablish the suction connection after the patch has been transferred.

12. A blank patching mechanism comprising, in combination, means for advancing at uniform speed sheet material to be patched, a support for a reel of patch web, feed rolls for drawing the patch web from the reel and paying it out at a uniform speed less than that of the material to be patched, a suction drum onto which the leading end of the patch web is delivered, means driving the suction drum constantly at a surface speed equal to the speed of the material to be patched so that the suction drum exerts a slip drag on the leading end of the patch web, a flying cutter comprising a first knife set into and rotatable with the suction drum and having its cutting edge permanently projecting above the periphery of the suction drum and a second rigid stationary knife cooperative with said first knife to cut a patch from the leading end of the slowly moving web at a cutting station, said second knife having its cutting edge spaced from the periphery of said drum to allow the leading edge of said patch web and the material of said web to pass freely between the surface of the suction cylinder and the stationary knife, a rotary suction patch applying segment running tangential to the suction drum and to the patch of the material to be patched, means driving the applying segment uniformly at the speed of the material to be patched, suction control means for causing the patch to be carried by the suction drum from the cutting station to a transfer point and to be there transferred from the suction drum to the patch applier, said suction drum being divided into a patch conveying and transferring segment and a plurality of slip drag segments, the suction control means referred to including control means acting on the supply of suction to the conveying and transferring segment, and in which further suction control means is provided for causing suction to be applied in the slip drag segments as they travel in the web contacting range of movement and to be cut off at other times, the first mentioned suction control means including a conduit normally in communication with a source of suction and constantly in communication with the conveying and transferring segment, and a clapper valve operable at the instant of patch control transfer to open wide communication of the conduit with the atmosphere while abruptly breaking communication of the conduit with the source of suction, and to reestablish the suction connection after the patch has been transferred.

References Cited in the file of this patent

UNITED STATES PATENTS

| | | |
|---|---|---|
| 1,752,608 | Olgay | Apr. 1, 1930 |
| 2,202,496 | La Bombard | May 28, 1940 |
| 2,206,043 | Novick | July 2, 1940 |